United States Patent Office 3,107,235
Patented Oct. 15, 1963

3,107,235
COMPOSITION COMPRISING A POLYESTER, DI-
CHLOROBENZIDINE AND 3,3'-DIMETHYL-4,4'-
DIPHENYLENE DIISOCYANATE AND TIRE
MADE THEREFROM
William M. Larson, Cuyahoga Falls, and Thomas G.
Mastin, Akron, Ohio; said Larson assignor to The
Goodyear Tire & Rubber Company, Akron, Ohio, a
corporation of Ohio
No Drawing. Filed Apr. 7, 1958, Ser. No. 726,644
4 Claims. (Cl. 260—75)

This invention relates to new compositions useful for molding elastomeric products from liquid reaction mixtures. More particularly it relates to polyurethane casting compositions, methods for molding products from the polyurethane casting compositions and to products made from the casting compositions.

Elastomeric polyurethane products prepared from the reaction between polyisocyanates and polymers containing reactive hydrogen atoms such as polyesters, polyesteramides and polyalkylene ether glycols are well known. Elastomeric polyurethane foams, solid processible polyurethane rubbers and liquid reaction mixtures capable of being cast into molded products have all been described.

The liquid castable reaction mixtures are prepared from polyesters, for example, which are either liquid at room temperature or capable of being melted at relatively low temperatures, and which are mixed with polyisocyanates, and preferably with a diisocyanate, and a cross-linking agent or reticulator such as water, a glycol or a diamine. Other non-reactive ingredients such as fillers, or coloring agents may be added if desired. The advantage of such casting compositions, in addition to the outstanding physical properties of the cured elastomeric polyurethane product, is that they can be poured into relatively simple lightweight molds and cured without the application of the high temperatures and pressures conventionally employed in molding rubber products from the solid natural and synthetic rubbers.

Representative examples of the molded products made from the liquid castable reaction mixture are solid industrial tires, gaskets, gears, reinforced timing belts, bushings, bearings and other machine components including metal reinforced molded parts for automobiles. The adhesion of these castable urethane compositions to metals such as iron, steel and aluminum makes them particularly useful in the production of metal reinforced rubber products.

Although the cured polyurethane elastomer possesses outstanding physical properties and adheres readily to metal, it has been observed that where heavy loads are applied to solid industrial tires for instance, the rubber part tends to heat up with the result that the rubber becomes softer and somewhat thermoplastic. In this softer thermoplastic state the rubber does not adhere as tenaciously to the metal part with the result that under continued operation at high load and high temperature the rubber part peels away from the metal part.

It is an object of this invention to provide a polyurethane casting composition which has, in addition to its other outstanding physical properties, improved resistance to softening and deformation at elevated temperatures. Another object is to provide such casting compositions which readily cure at relatively low temperatures and which are sufficiently stable in the liquid state to permit adequate mixing of the ingredients and adequate time for pouring the liquid mixture into the desired mold. Another object is to provide a method of making molded products from this improved casting composition. Still another object is to provide improved molded products from this castable polyurethane mixture. Other objects will appear as the description proceeds.

The improved polyurethane product of this invention is one prepared from the reaction between ortho dichlorobenzidene which functions as a reticulator or cross-linking agent, 3,3'-dimethyl 4,4'-diphenylene diisocyanate which functions as the curing agent and a liquid polyester prepared from at least one dicarboxylic acid and at least one glycol, the polyester having a molecular weight of from 1500 to 2500, a hydroxyl number of from 45 to 75 and an acid number not greater than 5. It has been found that the particular combination of ortho dichlorobenzidene and 3,3'-dimethyl 4,4'-diphenylene diisocyanate reacted with the polyester provides a cured polyurethane composition which has outstanding resistance to softening and deformation at elevated temperatures.

The polyesters used in the practice of this invention are those conventionally prepared by the condensation reaction between one or more dicarboxylic acids and one or more glycols. Representative examples of the dicarboxylic acids which may be used in preparing these polyesters are: succinic, glutaric, adipic, pimelic, suberic, azelaic and sebacic. Of these acids adipic and sebacic are particularly preferred. Representative examples of the glycols which may be used to prepare the polyesters are ethylene glycol, propylene glycol, butylene glycol pentamethylene glycol and hexamethylene glycol. Of these ethylene glycol, propylene glycol and mixtures of these two glycols are particularly preferred.

As indicated above, the polyester should have an average molecular weight of from 1500 to 2500 and a corresponding hydroxyl number of from 45 to 75 with an acid number not greater than 5. The molecular weight range indicated defines the polyesters which are of the proper consistency for pouring in the liquid state either at room temperature or at relatively low temperatures, and which yield cured polymers possessing outstanding physical properties. The maximum acid number is recited to eliminate from the scope of this invention those polyesters which are predominantly carboxyl-terminated which have been found to produce, when reacted with diisocyanate, products more resinous than rubber-like.

Of particular interest are the polyesters prepared from adipic acid and a mixture of glycols containing approximately 80 mol percent of ethylene glycol and 20 mol percent of propylene glycol in the molecular weight range of approximately 2000 and having an acid number not greater than 2.

As is well recognized in the production of polyurethane products, an excess of diisocyanate is generally employed to insure the cure of the polyester and to provide sufficient points of reaction with other ingredients containing reactive hydrogen such as ortho dichlorobenzidene. The amount of excess of the diisocyanate, while not critical, is important because the diisocyanate is usually the most expensive ingredient employed in the reaction mixture. Based upon one molecular weight of the polyester it has been found that the improved polyurethane products of this invention can be obtained by reacting the polyesters with from 0.10 to .8 mol of ortho dichlorobenzidene and from 1.25 to 2 mols of 3,3'-dimethyl 4,4'-diphenylene diisocyanate with the diisocyanate always being employed in a molar excess of at least 10% over the combined molecular amount of the dichlorobenzidene and the polyester.

A particularly effective formulation from the standpoint of the paysical properties of the cured product and the physical nature of the liquid mixture is one containing approximately 100 parts by weight of a polyester having an average molecular weight of approximately 2000, approximately 6 parts by weight of ortho dichlorobenzidene and approximately 23 parts by weight of 3,3'-dimethyl 4,4'-diphenylene diisocyanate.

The castable polyurethane reaction product of this invention is prepared by heating the polyester to a temperature of from 100° C. to 140° C., adding the diisocyanate followed by a thorough mixing or blending of the reactants for from 30 to 45 minutes, adding the diamine cross-linker followed by a thorough blending of this reactant into the mixture for approximately 1 minute and by pouring the complete reaction mixture into a mold or onto a casting surface. While the reaction mixture will set up without the application of additional heat, it has been found expedient to place the cast product into a heated air oven or to heat the mold by some other means as for instance in a curing press in order to accelerate the rate of cure of the reaction mixture. The application of pressure during the oven curing operation has been found not to be necessary or required. However, the application of pressure to products cured in a press has been found to produce beneficial results.

The practice of this invention is further illustrated with respect to the following example which is to be interpreted as representative rather than restrictive of the scope of this invention.

EXAMPLE 1

A polyester (100 parts) prepared from adipic acid and a mixture of glycols containing 80 mol percent of ethylene glycol and 20 mol percent of propylene glycol and having an average molecular weight of approximately 2000 and a hydroxyl number of approximately 57 and an acid number of 0.8 was heated at 120° C. for one hour under a vacuum of 20 millimeters of mercury. To this polyester 23 parts by weight of 3,3'-dimethyl 4,4'-diphenylene diisocyanate were added. The mixture was stirred for 30 minutes at 120° C. under a vacuum of 20 millimeters of mercury. Ortho dichlorobenzidene (6 parts by weight) was then added and mixed with the polyester and diisocyanate for 1 minute after which the complete reaction mixture was poured into a mold and cured for one hour at 120° C. The casting was then removed from the mold and baked for an additional 20 hours at 120° C.

A smear point determination was run on the cured sample in accordance with the test procedure described in an article by S. D. Gehman et al. in Rubber Chemistry and Technology, vol. XXVIII, No. 2, April-June 1955. The smear point of the cured material prepared according to Example 1 was 410° F.

Similar samples were prepared from other diisocyanates and other cross-linking agents with the molecular ratio of the reactants being the same as the ratio of polyester to diisocyanate to recticulator employed in Example 1, this ratio being 1:1.68:0.48. In Table I below are listed other diisocyanates and reticulators employed in preparing other polyurethanes along with the smear points determined for the cured samples resulting from the same conditions of cure employed in Example 1.

Table I

| Example | Diisocyanate | Reticulator | Smear point, °F. |
|---|---|---|---|
| 2 | MDI | MOCA | 374 |
| 3 | PDI | ODCB | 205 |
| 4 | PDI | MOCA | 325 |
| 5 | NDI | 1,4 butanediol | 230 |

MDI=4,4' diphenylene methane diisocyanate.
PDI=meta-phenylene diisocyanate.
ODCB=ortho dichlorobenzidine.
MOCA=methylene bis-ortho chloraniline.
NDI=1,5-napthalene disocyanate.

The temperature at which the polymer begins to soften or smear becomes particularly significant when the polymer is employed in the fabrication of articles which will be exposed to high temperature operation and particularly when such polymers are to be adhered to a metal part. An example of such an application is in the production of solid industrial tires where the tread rubber portion is adhered to a metal hub. While carrying heavy loads industrial truck tires are subjected to continuous flexing of the rubber portion. This flexing under load generates considerable heat which heat, if the rubber does not possess a high smear point, causes the rubber to soften and come away from the metal hub of the tire.

Actual installations of solid tires on industrial trucks made 24 hours after the curing of the tires have shown continued satisfactory performance from those tires made from the composition of this invention while similar installations made from other combinations of diisocyanate and reticulator have resulted in the melting off of the rubber from the metal hub.

While certain representative embodiments and details have been shown for the purpose of illustrating the invention, it will be apparent to those skilled in this art that various changes and modifications may be made therein without departing from the spirit or scope of the invention.

We claim:

1. As a new composition of matter the liquid reaction mixture comprising a polyester prepared from adipic acid and a glycol selected from at least one member of the group consisting of ethylene glycol and propylene glycol wherein the glycols are used in a mol percent ratio of ethylene glycol to propylene glycol ranging from 80/20 to 100/0, said polyester having a molecular weight of from 1500 to 2500, a hydroxyl number of from 45 to 75 and an acid number not greater than 5, from .1 to .8 mol of dichlorobenzidine per mol of polyester and 3,3'-dimethyl-4,4'-diphenylene diisocyanate, the diisocyanate being employed in a molar excess of at least 10% of the combined molecular amounts of the polyester and the orthodichlorobenzidine.

2. A solid, industrial tire, the rubber portion of which is made from the cured elastomer defined by claim 1.

3. As a new composition of matter the liquid reaction mixture comprising a polyester prepared from adipic acid and a mixture of glycols containing approximately 80 percent of ethylene glycol and approximately 20 mol percent of propylene glycol, said polyester having a molecular weight of from 1500 to 2500, a hydroxyl number of from 45 to 75 and an acid number not greater than 5, from 0.1 to 0.8 mol of ortho dichlorobenzidine per mol of polyester, and 3,3'-dimethyl-4.4'-diphenylene diisocyanate being employed in a molar excess of at least 10% over the combined molecular amounts of the polyester and the ortho dicholrobenzidine.

4. A solid industrial tire, the rubber portion of which is made from the cured elastomer defined by claim 3.

References Cited in the file of this patent

UNITED STATES PATENTS

| 2,621,166 | Schmidt et al. | Dec. 9, 1952 |
| 2,764,565 | Hoppe et al. | Sept. 25, 1956 |
| 2,778,810 | Muller et al. | Jan. 22, 1957 |

FOREIGN PATENTS

| 767,017 | Great Britain | Jan. 30, 1957 |
| 783,615 | Great Britain | Sept. 25, 1957 |

OTHER REFERENCES

Abernathy: "Isocyanates and Their Reaction Products," Rubber World, March 1955, volume 131, No. 6, pages 765–769.

UNITED STATES PATENT OFFICE
CERTIFICATE OF CORRECTION

Patent No. 3,107,235  
October 15, 1963

William M. Larson

It is hereby certified that error appears in the above numbered patent requiring correction and that the said Letters Patent should read as corrected below.

Column 4, lines 44 and 45, for "80 percent" read -- 80 mol percent --; line 51, before "being" insert -- , the diisocyanate --.

Signed and sealed this 31st day of May 1966.

(SEAL)  
Attest:

ERNEST W. SWIDER  
Attesting Officer

EDWARD J. BRENNER  
Commissioner of Patents